(12) United States Patent
Felix et al.

(10) Patent No.: US 9,197,365 B2
(45) Date of Patent: Nov. 24, 2015

(54) DECODING A CODED DATA BLOCK

(71) Applicant: Nvidia Corporation, Santa Clara, CA (US)

(72) Inventors: Stephen Felix, Bristol (GB); Dinkar Vasudevan, Bristol (GB); Steve Allpress, Bristol (GB)

(73) Assignee: NVIDIA CORPORATION, Santa Clara, CA (US)

( * ) Notice: Subject to any disclaimer, the term of this patent is extended or adjusted under 35 U.S.C. 154(b) by 108 days.

(21) Appl. No.: 13/626,606

(22) Filed: Sep. 25, 2012

(65) Prior Publication Data

US 2014/0086302 A1  Mar. 27, 2014

(51) Int. Cl.
*H04L 1/00* (2006.01)
*H04L 1/18* (2006.01)

(52) U.S. Cl.
CPC .............. *H04L 1/005* (2013.01); *H04L 1/1835* (2013.01)

(58) Field of Classification Search
CPC . H04K 1/0054; H04K 1/0057; H04K 1/0059; H04K 1/006; H04K 1/005; H04K 25/067; H04K 1/0066; H03M 13/4138; H03M 13/42; H03M 13/41; H03M 13/4115; H03M 13/2957; H03M 13/296; H03M 13/2963; H03M 13/2978; H03M 13/2987; H03M 13/3905; H03M 13/3927; H03M 13/3933; H03M 13/256; H03M 13/258; H03M 13/6502; H03M 13/6505; H03M 13/6508; H03M 13/3961; H03M 13/3966; H03M 13/23
USPC .................. 375/262, 265, 341; 714/786, 792, 714/794–796

See application file for complete search history.

(56) References Cited

U.S. PATENT DOCUMENTS 6,654,926 B1 * 11/2003 Raphaeli et al. .............. 714/780
2005/0138530 A1 * 6/2005 Huang et al. .................. 714/774

(Continued)

FOREIGN PATENT DOCUMENTS

EP  1337066 A1  8/2003
EP  2328296 A1  6/2011

OTHER PUBLICATIONS

Foreign Communication from a Related Counterpart Application, GB Application No. GB1315876.1; Great Britain Combined Search and Examination Report under Sections 17 & 18(3) dated Feb. 27, 2014, 2 pages.

*Primary Examiner* — Dac Ha

(57) ABSTRACT

Method, receiver and computer program product for decoding a coded data block received at the receiver are disclosed. A first plurality of coded data bits representing the coded data block are received. First soft information values are determined corresponding to respective ones of the received first plurality of coded data bits, wherein each of the soft information values indicates a likelihood of a corresponding coded data bit having a particular value. An attempt is made to decode the coded data block using the first soft information values. The first soft information values are compressed. The compressed first soft information values are stored in a data store. A second plurality of coded data bits representing the coded data block is received and second soft information values corresponding to respective ones of the received second plurality of coded data bits are determined. The compressed first soft information values are retrieved from the data store and decompressed. The decompressed first soft information values are combined with the second soft information values, and an attempt is made to decode the coded data block using the combined soft information values.

18 Claims, 3 Drawing Sheets

(56) References Cited

U.S. PATENT DOCUMENTS

| | | | |
|---|---|---|---|
| 2006/0170574 A1* | 8/2006 | Itani | 341/51 |
| 2007/0113144 A1* | 5/2007 | Li | 714/755 |
| 2010/0005356 A1 | 1/2010 | Cho et al. | |
| 2012/0047408 A1* | 2/2012 | Wilborn et al. | 714/718 |
| 2012/0072434 A1* | 3/2012 | Kataoka et al. | 707/750 |
| 2012/0166503 A1* | 6/2012 | Portell I De Mora et al. | 708/203 |
| 2014/0223029 A1* | 8/2014 | Bhaskar et al. | 709/247 |

\* cited by examiner

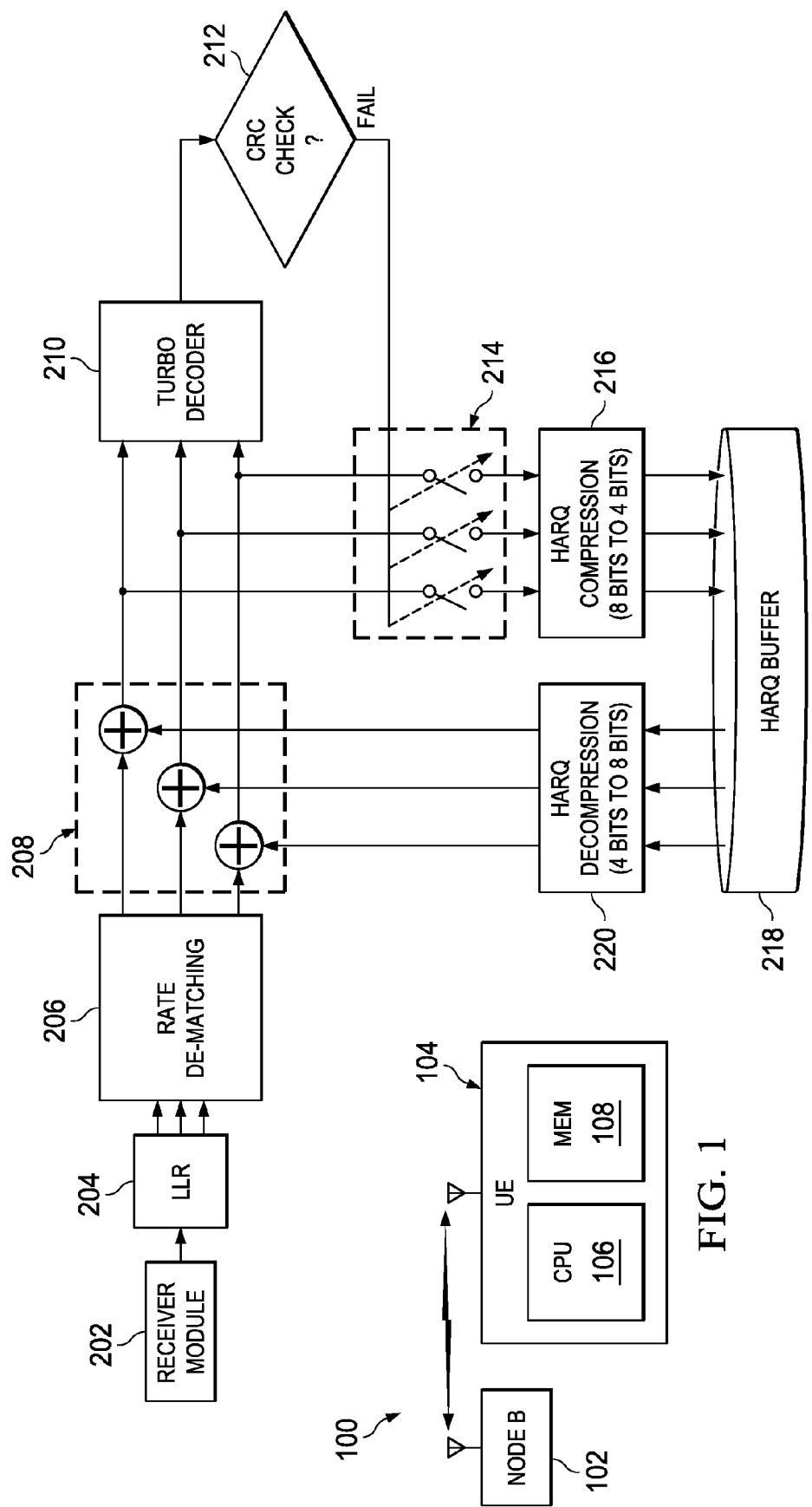

DECODING A CODED DATA BLOCK

TECHNICAL FIELD

The disclosure relates to decoding a coded data block. In particular, the disclosure relates to decoding a coded data block which has been received at a receiver.

BACKGROUND

A radio access network allows entities to communicate with each other over a wireless, radio channel. For example, a user equipment (UE) is able to communicate with network elements such as a base station (or "Node B") over a radio access network. When entities communicate with each other they must conform to standard protocols so that each entity can correctly interpret the data received from other entities. Third Generation Partnership Project (3GPP) is one wireless cellular standard protocol which can be used.

Hybrid Automatic Repeat Request (HARQ) communication may be implemented within the 3GPP protocol. In HARQ communication, data blocks are coded for transmission from a transmitter (e.g. a Node B) to a receiver (e.g. a UE). As coded data blocks are transmitted from the transmitter to the receiver, some of the data blocks may become corrupted or lost during transmission. This may cause a problem for the receiver when the receiver attempts to decode the data blocks. According to the HARQ protocol data blocks may be coded to include error detection bits (e.g. cyclic redundancy check (CRC) bits) and/or error correction bits (e.g. forward error correction (FEC) bits) to help the receiver to correctly decode the data blocks.

A receiver will attempt to decode coded data blocks received from a transmitter, and may use error correction bits included with the data blocks for this decoding. The error detection bits are used to determine whether the data blocks have been correctly decoded at the receiver, e.g. by performing a CRC check on the decoded data blocks. Failure of decoding a data block is indicated by a failure of the CRC check for the constituent data bits. Data blocks which are not decoded successfully by the receiver on the first transmission attempt may be periodically re-transmitted by the transmitter until they are successfully decoded by the receiver. In some systems, the receiver may request retransmission of incorrectly decoded data blocks. In other systems the transmitter may periodically transmit the coded data blocks until an acknowledgement is received from the receiver to indicate that the data blocks have been correctly decoded at the receiver.

In a receiver implementing the 3GPP Long Term Evolution (LTE) protocol, in order to decode the received coded data bits of a data block, the receiver determines soft information values (e.g. Log-Likelihood Ratio (LLR) values) for the respective coded bits, where each soft information value is 8 bits and indicates the likelihood of a respective coded data bit being a zero. In the case where the soft information values (or "HARQ information") comprise 8-bit LLR values that are signed, each LLR value gives a value in the range [−127, 127]. A positive value indicates a higher chance of the corresponding coded bit (or "codeword bit") being 0, while a negative value indicates a higher chance of the coded bit being 1. For example, an LLR value of:

−127 indicates that the corresponding coded bit is "definitely 1";
−100 indicates that the corresponding coded bit is "very likely 1";
0 indicates that the corresponding coded bit "could be either 0 or 1 with equal probability";
100 indicates that the corresponding coded bit is "very likely 0"; and
127 indicates that the corresponding coded bit is "definitely 0".

In HARQ communication, the soft information values (e.g. LLR values for each turbo-coded transmitted bit of the data block) which are used in each failed decoding attempt are stored and re-used for future decoding attempts. When a coded data block is retransmitted, the receiver determines the soft information values for the retransmitted coded data bits of the coded data block and combines these new soft information values with the soft information values stored from previous attempts to decode the data block. The combined soft information values can then be used to attempt to decode the coded data block.

SUMMARY

According to a first aspect a method of decoding a coded data block received at a receiver is provided. In one embodiment, the method includes: receiving a first plurality of coded data bits representing the coded data block; determining first soft information values corresponding to respective ones of the received first plurality of coded data bits, wherein each of the soft information values indicates a likelihood of a corresponding coded data bit having a particular value; attempting to decode the coded data block using the first soft information values; compressing the first soft information values; causing the compressed first soft information values to be stored in a data store; receiving a second plurality of coded data bits representing the coded data block; determining second soft information values corresponding to respective ones of the received second plurality of coded data bits; retrieving the compressed first soft information values from the data store; decompressing the retrieved first soft information values; combining the decompressed first soft information values with the second soft information values; and attempting to decode the coded data block using the combined soft information values.

According to a second aspect, the disclosure provides a receiver configured to decode a received coded data block. In one embodiment, the receiver includes: a receiver module configured to receive a first plurality of coded data bits representing the coded data block, the receiver module being further configured to receive a second plurality of coded data bits representing the coded data block; a determining module configured to determine first soft information values corresponding to respective ones of the received first plurality of coded data bits, the determining module being further configured to determine second soft information values corresponding to respective ones of the received second plurality of coded data bits, wherein each of the soft information values indicates a likelihood of a corresponding coded data bit having a particular value; a decoder configured to attempt to decode the coded data block using the first soft information values; a compressing module configured to compress the first soft information values, wherein the receiver is configured to cause the compressed first soft information values to be stored in a data store; a decompressing module configured to receive the compressed first soft information values retrieved from the data store and to decompress the retrieved first soft information values; and a combining module configured to combine the decompressed first soft information values with the second soft information values, wherein the decoder is further configured to attempt to decode the coded data block using the combined soft information values.

According to a third aspect, the disclosure provides a computer program product configured to decode a coded data block received at a receiver. In one embodiment, the computer program product is embodied on a non-transient computer-readable medium and configured so as when executed on a processor of the receiver to perform the method according to the first aspect.

BRIEF DESCRIPTION OF THE DRAWINGS

For a better understanding of the disclosure and to show how the same may be put into effect, reference will now be made, by way of example, to the following drawings in which:

FIG. 1 shows components in a radio access network;

FIG. 2 is a functional diagram of a receiver according to an embodiment of the disclosure;

DETAILED DESCRIPTION

Figure 3:
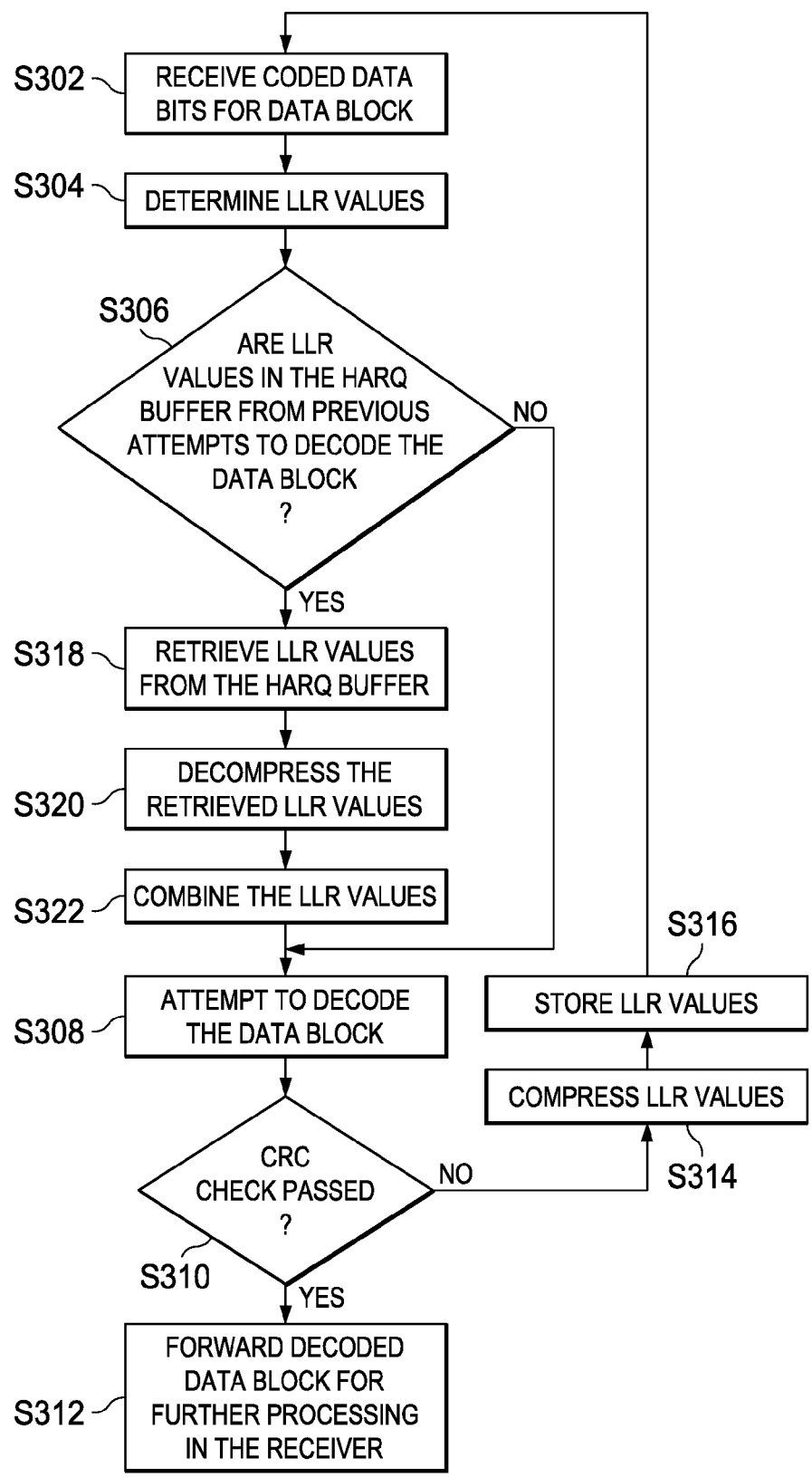
FIG. 3 is a flow chart for a method of decoding a coded data block at a receiver.

The disclosure appreciates that storing soft information values (e.g. LLR values) which are used in each failed decoding attempt results in a requirement to store large quantities of data. Given the significant storage requirements of storing the soft information values, it may be preferable to store the soft information values in a memory that is external to the receiver. In a high data rate wireless system such as a system using the 3GPP LTE protocol, the HARQ traffic (that is, the transmission of the soft information values between the receiver and the memory) can thus impose a significant load on the external memory bandwidth.

As noted above, the disclosure provides a method of decoding a coded data block received at a receiver. In some embodiments, the memory needed for storage of the soft information values in the data store is reduced due to compression of the soft information values. Furthermore, by compressing the soft information values prior to causing them to be stored in the data store the bandwidth of the traffic to and from the data store is reduced. The reduction in memory size is particularly advantageous in embodiments using internal memory since internal memory is relatively costly. The reduced bandwidth is particularly advantageous in embodiments using external memory since it is relatively costly to provision for high external peak bandwidths. These advantages are achieved, while at the same time having a negligible impact on the system throughput performance.

The method may further comprise determining whether the attempt to decode the coded data block using the first soft information values has failed, wherein the operations of compressing the first soft information values and causing the compressed first soft information values to be stored in the data store may be performed responsive to determining that the attempt to decode the coded data block using the first soft information values has failed. The step of determining whether the attempt to decode the coded data block using the first soft information values has failed may comprise performing a cyclic redundancy check.

The second plurality of coded data bits representing the coded data block may be a retransmission of the coded data block. For example, at least some of the second plurality of coded data bits may be a retransmission of a corresponding at least some of the first plurality of coded data bits.

In the method, the step of compressing the first soft information values may halve the number of bits of each of the first soft information values. For example, each of the uncompressed soft information values may have 8 bits and each of the compressed soft information values may have 4 bits.

The step of compressing the first soft information values may comprise using a compression scheme to map a plurality of ranges of uncompressed soft information values to a respective plurality of compressed soft information values. The step of decompressing the retrieved first soft information values may comprise using a decompression scheme to map a plurality of compressed soft information values to a respective plurality of decompressed soft information values, wherein the decompression scheme corresponds to the compression scheme used to compress the first soft information values.

The compression scheme may be a non-linear compression scheme in which the ranges are of unequal sizes. For example, the sizes of the ranges may be smaller nearer to the middle of the total range of possible uncompressed soft information values. Alternatively, the compression scheme may be a linear compression scheme in which the ranges are of equal sizes.

The data store may be either: (i) internal to the receiver, or (ii) external to the receiver and the receiver may implement a Hybrid Automatic Repeat Request protocol to receive the coded data block.

The soft information values may be Log-Likelihood Ratio values.

As noted above, the disclosure also provides a receiver configured to decode a received coded data block. In one embodiment, the receiver may further comprise a checking module configured to determine whether the attempt to decode the coded data block using the first soft information values has failed, wherein, responsive to said checking module determining that the attempt to decode the coded data block using the first soft information values has failed, the compressing module may be configured to compress the first soft information values, and the receiver may be configured to cause the compressed first soft information values to be stored in the data store. The checking module may be configured to perform a cyclic redundancy check.

The receiver may further comprise the data store. Alternatively, the data store may be external to the receiver, and the receiver may be configured to transmit the compressed first soft information values to the data store and retrieve the compressed first soft information values from the data store.

With reference to FIG. 1 there is described a radio access network 100 according to an embodiment. The radio access network 100 includes network elements such as a base station (which may be referred to as a "Node B") 102 and a user equipment (UE) 104 which is operated by a user. As shown in FIG. 1, the UE 104 comprises a processor 106 for processing data and a memory 108 for storing data, where for example the data is for transmission to, or has been received from, the base station 102. The UE 104 is arranged to receive information from and output information to the user of the UE 104. The UE 104 may, for example, be a mobile user device. In one embodiment the UE 104 comprises output devices such as a display and a speaker and input devices such as a keypad, a touch-screen, and/or a microphone.

The UE 104 is configured to receive data which has been transmitted wirelessly from the base station 104, e.g. according to the 3GPP LTE protocols. HARQ communication is used to transmit the data from the transmitter (base station 102) to the receiver (UE 104). As described above, according to the HARQ communication protocol, data blocks are coded to include error detection bits (e.g. cyclic redundancy check (CRC) bits) and/or error correction bits (e.g. forward error correction (FEC) bits) to help the receiver to correctly decode the data blocks. In some embodiments the data bits of the transmitted data blocks are coded using a turbo coder. Details of turbo coding are known in the art and as such are not described in detail herein.

FIG. 2 shows a functional diagram of the receiver 104. The receiver 104 includes a receiver module 202 configured to receive coded data blocks from the transmitter 102, an LLR module 204 configured to determine LLR values, a rate de-matching module 206, a combining module 208 configured to combine LLR values, a turbo decoder 210, a CRC checking module 212, a switching module 214, a HARQ compressing module 216, a data store indicated as a "HARQ buffer" 218 and a HARQ decompressing module 220. An output of the receiver module 202 is coupled to an input of the LLR module 204. A plurality of outputs of the LLR module 204 are coupled to a respective plurality of inputs of the rate de-matching module 206. A plurality of outputs of the rate de-matching module 206 are coupled to the combining module 208. A plurality of outputs of the combining module 208 are coupled to a respective plurality of inputs of the turbo decoder 210 and to a respective plurality of inputs of the switching module 214. An output of the turbo decoder 210 is coupled to an input of the CRC checking module 212. An output of the CRC checking module is coupled to a control input of the switching module 214. Outputs of the switching module are coupled to respective inputs of the HARQ compressing module 216. Outputs of the HARQ compressing module 216 are coupled to the HARQ buffer 218. Outputs of the HARQ buffer 218 are coupled to inputs of the HARQ decompressing module 220. Outputs of the HARQ decompressing module 220 are coupled to inputs of the combining module 208.

With reference to FIGS. 2 and 3 there is now described a method according to embodiments.

The receiver module 202 may comprise an antenna for wirelessly receiving the coded data blocks transmitted from the transmitter 102. The receiver module 202 may also comprise a processing module for processing the signals received by the antenna and to provide a sequence of coded data bits representing the signal received at the antenna. In operation, in step S302, the receiver module 202 receives coded data bits for a data block and provides the coded data bits to the LLR module 204. However, as described above, the signal carrying a coded data block may be corrupted or lost during transmission from the transmitter 102 to the receiver 104, therefore the coded data bits output from the receiver module 202 to the LLR module 204 may not accurately represent the coded data block.

In step S304, the LLR module 204 determines LLR values corresponding to the coded data bits. The LLR values indicate the likelihood of the corresponding coded data bits having a value of zero. As described above, the LLR values comprise 8-bits and are signed, such that each LLR value gives a value in the range [−127, 127]. A positive value indicates a higher chance of the corresponding coded bit (or "codeword bit") being 0, while a negative value indicates a higher chance of the coded bit being 1. In other embodiments, a positive value may indicate a higher chance of the corresponding coded bit (or "codeword bit") being 1, while a negative value indicates a higher chance of the coded bit being 0. Bits which have not been transmitted (e.g. due to code puncturing) have LLR equal to zero and so are unknown, relying on turbo decoding to resolve them.

Consider, for example, the case where the 8-bit LLR values are represented at a scale factor of 16, i.e., the reference (or floating point) value of the computed LLR values is given by the fixed point value divided by 16.

The rate de-matching module 206 inserts the LLR values into appropriate positions in the input stream for input to the turbo decoder 210.

In step S306 it is determined whether there are LLR values already stored in the HARQ buffer 218 from previous attempts to decode the data block. If there are no LLR values already stored in the HARQ buffer 218, for example if this is the first attempt to decode the data block, then the method passes to step S308, and the LLR values are passed to the turbo decoder 210 without being changed by the combining module 208.

In step S308 the turbo decoder 210 attempts to decode the LLR values to determine the data block. Turbo decoding is known and as such details of the turbo decoding process are not described in detail herein. The output of the decoding process is passed from the turbo decoder 210 to the CRC checking module 212.

In step S310 the CRC checking module 212 performs a CRC check on the output of the turbo decoder 210. The CRC check uses error detection bits which are included in the received data stream to determine whether the coded data bits of the coded data block have been correctly decoded.

If in step S310 it is determined that the coded data bits have passed the CRC check, thereby indicating that the turbo decoder 210 has successfully decoded the coded data bits of the coded data block, then the method passes to step S312. There is no need for the coded data block to be retransmitted from the transmitter 102 because it has been correctly decoded by the turbo decoder 210. In step S312 the correctly decoded data block is forwarded for further processing in the receiver 104. The correctly decoded data block may be used for a number of purposes in the receiver 104. For example, the data block may represent media such as text, sound or images to be output at the receiver 104, e.g. to a user of the receiver 104. As another example, the data block may include data to be stored at the receiver 104, e.g. in the memory 108 of the receiver 104 which may, or may not, be the same memory as where the HARQ buffer 218 is stored. The data blocks may be used for any purpose at the receiver 104 once they have been correctly received and decoded.

If in step S310 it is determined that the coded data bits have not passed the CRC check, thereby indicating that the turbo decoder 210 has not successfully decoded the coded data bits of the coded data block, then the method passes to step S314.

In step S314 the "fail" signal from the CRC checking module 212 is activated which thereby closes the switches in the switching module 214. The closure of the switches in the switching module 214 means that the LLR values which were input to the turbo decoder 210 are also input to the HARQ compressing module 216. The HARQ compressing module 216 compresses the LLR values. The compression of the LLR values reduces the number of bits used to represent the LLR values. For example, in some embodiments, the 8-bit LLR value of each codeword bit (i.e. each coded data bit) that has been input to the turbo decoder 210 is compressed to a 4-bit value. In this way, the number of bits used to represent the LLR values is halved. Some compression schemes which may be used to compress the LLR values are described in more detail below.

In step S316 the compressed LLR values are stored in the HARQ buffer 218. FIG. 2 shows the HARQ buffer 218 being internal to the receiver 104, and may be stored in memory 108. However, the HARQ buffer 218 could be external to the receiver 104.

From step S316 the method passes back to step S302 and another set of coded data bits for the coded data block are received at the receiver 104. According to the HARQ communication scheme, the coded data block is retransmitted from the transmitter 102 to the receiver 104 because the first attempt to transmit the coded data block was not successful (as determined by the CRC check in step S310). As described above, to initiate the retransmission of the coded data block, the receiver 104 may request that the coded data block is retransmitted or the transmitter 102 may determine that the coded data block should be retransmitted if an acknowledgement that the data block has been correctly decoded has not been received after a predetermined period of time following the original (or previous) transmission of the coded data block. Each transmission of the coded data block may include the same coded data bits. Alternatively, different transmissions of the coded data block may be coded differently (e.g. using different puncturing codes) such that the different transmissions of the coded data block comprise different coded data bits.

As described above, in step S304, LLR values are determined by the LLR module 204 for the newly received coded data bits for the data block.

Then, in step S306 it is determined that there are LLR values already stored in the HARQ buffer 218 (those stored in step S316) from the previous attempt to decode the data block. The method then passes to step S318.

In step S318 the compressed LLR values previously stored in the HARQ buffer 218 are retrieved from the HARQ buffer 218. The retrieved LLR values are passed to the HARQ decompressing module 220.

In step S320 the HARQ decompressing module 220 decompresses the compressed LLR values in order to determine decompressed LLR values. The decompressing module 220 uses a decompression scheme which corresponds to the compression scheme used by the HARQ compressing module 216 in step S314 to compress the LLR values. The decompression of the LLR values increases the number of bits used to represent the LLR values. The decompressed LLR values have the same number of bits as the (uncompressed) LLR values output from the LLR module 204. This facilitates a combination of the decompressed LLR values with the newly determined LLR values. For example, in some embodiments, the 4-bit compressed LLR value for each codeword bit (i.e. each coded data bit) of the coded data block is decompressed to an 8-bit value. Some decompression schemes which may be used to decompress the compressed LLR values are described in more detail below.

In step S322 the combining module 208 combines the decompressed LLR values output from the decompressing module 220 with the LLR values output from the rate de-matching module 206. In particular, the soft bits (LLR values) of the newly received coded data bits are combined with the LLR values for the respective bits which have been retrieved from the HARQ buffer 218 and decompressed. The combining operation may for example be an addition of the LLR values. In other embodiments different types of soft information values other than LLR values may be used and/or the combining operation may be something other than an addition operation, e.g. a weighted addition operation or a multiplication operation. As shown in FIG. 2 each of the LLR values output from the rate de-matching module 206 is combined with (e.g. added to) an LLR value retrieved from the HARQ buffer 218 for the corresponding coded data bit from the previous attempt to decode the coded data block.

The method then passes to step S308 in which the combined LLR values are input to the turbo decoder 210 and then turbo decoder attempts to decode the combined LLR values. The method then proceeds from step S308 with the combined LLR values as described above in relation to the original LLR values.

Therefore, according to the method shown in FIG. 3, on every decoding attempt (except the first attempt), the compressed 4-bit LLR values in the HARQ buffer 218 are decompressed into 8-bit LLR values and combined additively with the 8-bit LLR values at the output of the rate de-matching module 206 which have been generated from the current transmission.

The LLR values are accumulated over unsuccessful decoding attempts and stored in a compressed form in the HARQ buffer 218. For an LTE receiver implementation which relies on an 8-bit storage for each LLR value, if the LLR values were not compressed then the total memory needed in the HARQ buffer for storing the LLR values in a sub-frame for the case of 10 MHz LTE can be calculated to be as high as 0.23 MB. This would imply a maximum rate of about 230 MB/s for the reading and writing of the LLR values into and out of the HARQ buffer 218.

Figure 4A:
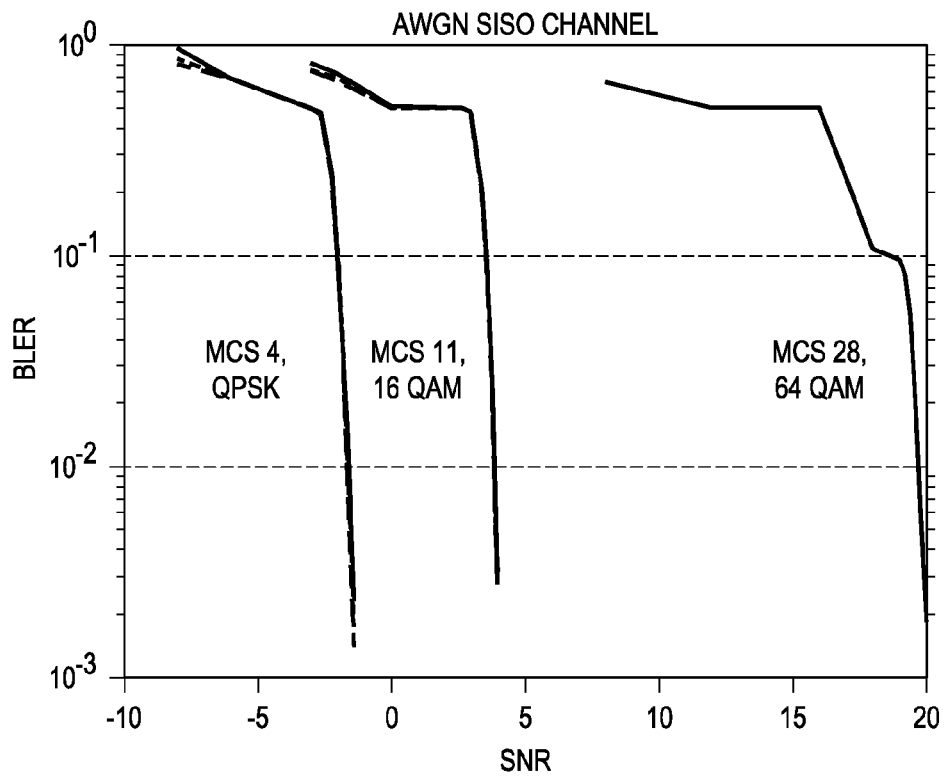
FIG. 4a is a graph showing Block Error Rates (BLERs) against Signal to Noise Ratio (SNR) for three coding schemes and for three compression schemes over an Additive White Gaussian Noise (AWGN) channel.
Figure 4B:
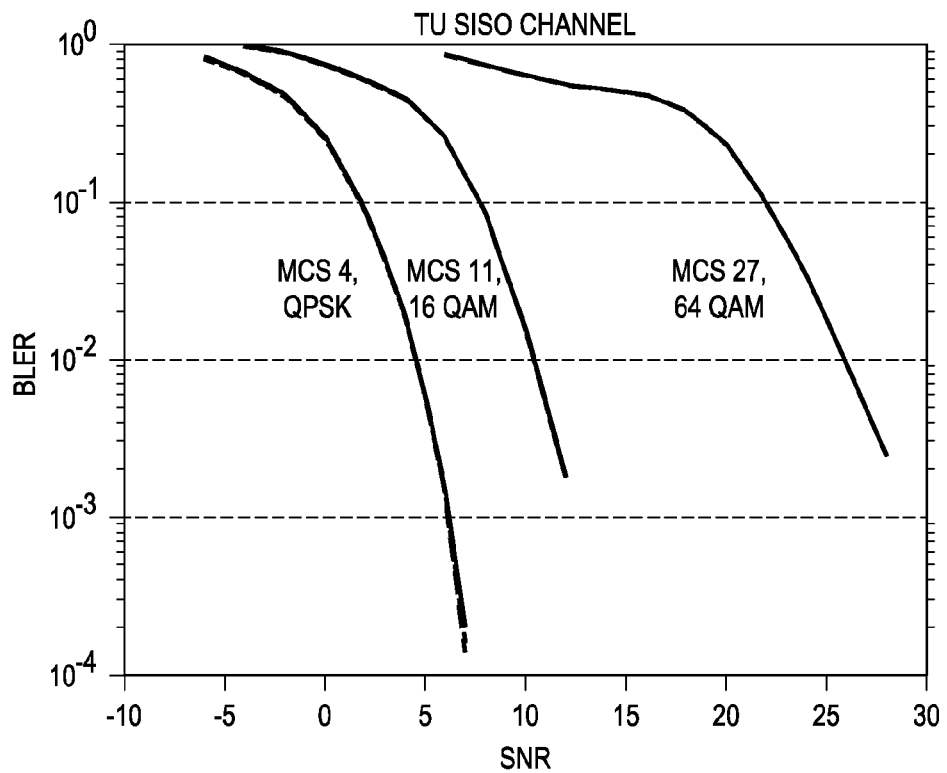
FIG. 4b is a graph showing Block Error Rates (BLERs) against Signal to Noise Ratio (SNR) for three coding schemes and for three compression schemes over a Typical Urban (TU) channel.

Advantageously, as described herein, the LLR values are compressed before being written into the HARQ buffer 218. This reduces the storage requirements in the HARQ buffer 218 for storing the LLR values. According to embodiments in which the LLR values are compressed from 8 bits to 4 bits, the compression scheme for the storage of the LLR values halves the memory requirement in the HARQ buffer 218 for storing the LLR values. Furthermore, compressing the LLR values prior to writing them into the HARQ buffer 218 reduces the traffic to and from the HARQ buffer 218. This is particularly advantageous when the HARQ buffer 218 is external to the receiver 104. According to embodiments in which the HARQ buffer 218 is implemented on an external memory and in which the LLR values are compressed from 8 bits to 4 bits, the compression scheme halves the HARQ traffic between the an internal receiver memory and the external memory. This is because the amount of data required to be transferred both for writing in and reading out of the HARQ buffer is halved. Furthermore, as shown in FIGS. 4a and 4b which are described in more detail below, these advantages are achieved without significantly compromising the throughput performance of the communication system.

As described above, in some embodiments the compressing module 216 compresses the 8-bit LLR values into 4-bit compressed LLR values. In other embodiments the compressing module 216 may compress the LLR values into a compressed LLR values having a number of bits other than 4. For example, the compressed LLR values may have 6 bits. However, compressing the LLR values from 8 to 4 bits may be advantageous because 4 bits pack more simply into bytes and so the challenge of addressing them in memory (e.g. in the HARQ buffer 218) is simpler than, for example, 6-bit LLR values. Furthermore, as described in more detail below with reference to FIGS. 4a and 4b simulations suggest a negligible degradation in the Block Error Rate (BLER) when using the compressed 4-bit LLR values. In general, other compression ratios could be used, to compress LLR values having $n_1$ bits into compressed LLR values having $n_2$ bits, where $n_1 > n_2$.

Whilst it is useful in terms of storage and transmission requirements to compress the LLR values (e.g. to 4 bits) prior to writing them into the HARQ buffer 218, it is also useful to decompress the LLR values (e.g. back to 8 bits) prior to attempting to decode the LLR values using the turbo decoder 210. Since the turbo processing by the turbo decoder 210 is performed on 8-bit LLR values as opposed to 4 bits, information is not lost from the LLR values arising from the latest transmission of the codeword block. In other words, the accuracy of the LLR values on which the turbo decoding is performed is maintained at a high level by keeping all 8 bits of information of the LLR values determined from the latest transmission of the coded data bits.

The compressed LLR values which are written into the HARQ buffer 218 when the turbo decoder 210 has not correctly decoded the received coded data bits may be overwritten by more recently determined LLR values for the coded data block. Furthermore, the compressed LLR values may be removed from the HARQ buffer 218 after a predetermined period of time, or when the coded data block is correctly decoded by the turbo decoder 210. For example, if the CRC checking module 212 determines that the turbo decoder 210 has correctly decoded the data block then, responsive thereto, the LLR values stored in the HARQ buffer 218 for that data block may be removed from the HARQ buffer 218.

There are described below two compression and decompression schemes which may be implemented to compress and decompress the LLR values. According to the compression schemes, a plurality of ranges of the uncompressed LLR values are mapped to a respective plurality of compressed LLR values. The decompression schemes map a plurality of compressed LLR values to a respective plurality of decompressed LLR values.

There is first described a non-linear compression scheme and a corresponding non-linear decompression scheme, and then there is described a linear compression scheme and a corresponding linear decompression scheme.

Non-linear Compression/Decompression Scheme

Table 1 shows how a non-linear compression scheme maps ranges of uncompressed 8-bit LLR values to compressed 4-bit LLR values. In the non-linear compression scheme shown in Table 1 the ranges are of unequal sizes. In particular, sizes of the ranges are smaller nearer to the middle of the total range of possible uncompressed LLR values. In other words, the intervals (range of values that map to a given compressed value) closer to the value 0 are smaller compared to the intervals for the higher absolute values. In this way a non-linear compression scheme has the ability to better resolve the LLR values having lower absolute values.

TABLE 1

| Non-linear compression | |
|---|---|
| 8 bit LLR | 4 bit LLR (Compressed value) |
| +127 to +110 | +7 |
| +109 to +79 | +6 |
| +78 to +53 | +5 |
| +52 to +32 | +4 |
| +31 to +17 | +3 |
| +16 to +6 | +2 |
| +5 to +1 | +1 |
| 0 | 0 |
| −1 to −5 | −1 |
| −6 to −16 | −2 |
| −17 to −31 | −3 |
| −32 to −52 | −4 |

TABLE 1-continued

| Non-linear compression | |
|---|---|
| 8 bit LLR | 4 bit LLR (Compressed value) |
| −53 to −78 | −5 |
| −79 to −109 | −6 |
| −110 to −128 | −7 |

Table 2 shows a corresponding non-linear decompression scheme which may be used by the decompressing module 220 to decompress the 4-bit compressed LLR values which have been compressed by the compressing module 216 using the non-linear compression scheme shown in Table 1. The non-linear decompression scheme shown in Table 2 corresponds to the non-linear compression scheme shown in Table 1.

TABLE 2

| Decompression for non-linear compression | |
|---|---|
| 4 bit LLR | 8 bit LLR (Decompressed value) |
| +7 | +127 |
| +6 | +94 |
| +6 | +65 |
| +4 | +42 |
| +3 | +24 |
| +2 | +11 |
| +1 | +3 |
| 0 | 0 |
| −1 | −3 |
| −2 | −11 |
| −3 | −24 |
| −4 | −42 |
| −5 | −65 |
| −6 | −94 |
| −7 | −127 |

As an example, if an uncompressed LLR value of +13 is compressed using the non-linear compression scheme shown in Table 1 the compressed LLR value stored in the HARQ buffer 218 will be +2. The corresponding decompressed LLR value which is found using the non-linear decompression scheme shown in Table 2 will be +11.

Linear Compression/Decompression Scheme

Table 3 shows how a linear compression scheme maps ranges of uncompressed 8-bit LLR values to compressed 4-bit LLR values. In the linear compression scheme shown in Table 3 most of the ranges are of equal sizes. In particular, all intervals (except the intervals corresponding to values +7 or −7) are of the same length.

TABLE 3

| Linear compression | |
|---|---|
| 8 bit LLR | 4 bit LLR (Compressed value) |
| +127 to +119 | +7 |
| +118 to +101 | +6 |
| +100 to +83 | +5 |
| +82 to +64 | +4 |
| +63 to +46 | +3 |
| +45 to +28 | +2 |
| +27 to +10 | +1 |
| +9 to −9 | 0 |
| −10 to −27 | −1 |
| −28 to −45 | −2 |

TABLE 3-continued

Linear compression

| 8 bit LLR | 4 bit LLR (Compressed value) |
|---|---|
| −46 to −63 | −3 |
| −64 to −82 | −4 |
| −83 to −100 | −5 |
| −101 to −118 | −6 |
| −119 to −128 | −7 |

Table 4 shows a corresponding linear decompression scheme which may be used by the decompressing module 220 to decompress the 4-bit compressed LLR values which have been compressed by the compressing module 216 using the linear compression scheme shown in Table 3. The linear decompression scheme shown in Table 4 corresponds to the non-linear compression scheme shown in Table 3.

TABLE 4

Decompression for linear compression

| 4 bit LLR | 8 bit LLR (Decompressed value) |
|---|---|
| +7 | +127 |
| +6 | +109 |
| +6 | +91 |
| +4 | +73 |
| +3 | +54 |
| +2 | +36 |
| +1 | +18 |
| 0 | 0 |
| −1 | −18 |
| −2 | −36 |
| −3 | −54 |
| −4 | −73 |
| −5 | −91 |
| −6 | −109 |
| −7 | −127 |

As an example, if an uncompressed LLR value of +13 is compressed using the linear compression scheme shown in Table 3 the compressed LLR value stored in the HARQ buffer 218 will be +1. The corresponding decompressed LLR value which is found using the non-linear decompression scheme shown in Table 4 will be +18.

It can therefore be seen that the compression and then decompression of the LLR values (using either the non-linear scheme or the linear scheme described above) loses some accuracy of the LLR values, but as shown below with reference to FIGS. 4a and 4b this slight loss in accuracy does not significantly impact the performance of the system. Furthermore, the advantages to the storage and transmission requirements for storing and transmitting the compressed LLR values may outweigh any disadvantage which may result from the slight loss in accuracy of the LLR values due to the compression and decompression of the LLR values at a typical BLER and Signal to Noise Ratio (SNR) that a wireless communication system operates at.

The non-linear and linear compression schemes described above were tested for losses in performance, captured by the Block Error Rates (BLER). In particular, the BLER for LTE codewords using three different modulation and coding schemes (MCS) (Quadrature phase-shift keying (QPSK), Quadrature amplitude modulation (QAM)—both 16 QAM and 64 QAM) were checked for the three compression/decompression schemes: (i) the optimal scheme which does not do any LLR compression, (ii) the non-linear compression/decompression scheme described above in relation to Tables 1 and 2, and (iii) the linear compression/decompression scheme described above in relation to Tables 3 and 4. Two propagation channel types are considered and are shown respectively in FIGS. 4a and 4b.

FIG. 4a shows the BLER as a function of the SNR for three codewords having MCS of 4, 11 and 28 (that is, for QPSK, 16 QAM and 64 QAM) over an Additive White Gaussian Noise (AWGN) Single Input Single Output (SISO) channel which is frequency flat and non-time varying. For each modulation scheme (QPSK, 16 QAM and 64 QAM) three curves are plotted corresponding to the optimal scheme, the non-linear compression scheme (as described above in relation to Tables 1 and 2) and the linear compression scheme (as described above in relation to Tables 3 and 4). For each modulation scheme the curves for the three compression schemes are so close to each other that there is no visible difference in the region of 10% BLER, which is typically the operating point of 3GPP communication systems. It can be seen in FIG. 4a however for the AWGN channel that at very high BLERs and low SNRs there is a visible degradation for QPSK and 16 QAM codes, which may be relevant for some of the 3GPP fixed reference channel performance tests. At these very high BLERs and low SNRs the curves for the three compression schemes can be seen to diverge from each other with the optimal scheme having the lowest BLER, the non-linear compression scheme having a higher BLER and the linear compression scheme having an even higher BLER. The maximum degradation can be checked to be about 1.3 dB. The degradation, though sizeable, occurs in a very high BLER regime where a 3GPP communication system would not be operating.

FIG. 4b shows the BLER as a function of the SNR for three codewords having MCS of 4, 11 and 27 (that is, for QPSK, 16 QAM and 64 QAM) respectively over a Typical Urban (TU) SISO channel which is both frequency selective and time-varying. For each modulation scheme (QPSK, 16 QAM and 64 QAM) three curves are plotted corresponding to the optimal scheme, the non-linear compression scheme (as described above in relation to Tables 1 and 2) and the linear compression scheme (as described above in relation to Tables 3 and 4). For each modulation scheme the curves for the three compression schemes are so close to each other that there is no visible difference between them in FIG. 4b, and in particular, there is no visible difference in the region of 10% BLER, which is typically the operating point of 3GPP communication systems.

There are described herein methods for compression and decompression of log likelihood ratio (LLR) values of turbo coded bits of a data block in the HARQ buffer 218 of the receiver 104. The methods are not limited to use with LLR values and similar methods could be used with other soft information values.

FIG. 2 shows the HARQ buffer 218 being internal to the receiver 104 (e.g. being stored in the memory 108), but in some embodiments the HARQ buffer 218 is external to the receiver 104, wherein communication between the receiver 104 and an external HARQ buffer is achieved using an external interface. An external HARQ buffer may be local to the receiver 104 and may be connected to the receiver 104 via a local connection such as a USB connection. Alternatively, an external HARQ buffer may not be local to the receiver 104, for example the HARQ buffer may be implemented in the Internet and may be connected to the receiver 104 via a network interface such as a modem. By having an external HARQ buffer the storage requirements (which may be significant) are not a problem for the receiver 104. This can be particularly useful when the receiver 104 is a mobile device for which size, cost and weight are all important factors. Therefore removing the storage requirements away from a mobile device to an external memory is particularly advantageous.

In the embodiments described in detail herein the UE 104 acts as a receiver for receiving data from the base station 102 which acts as a transmitter. However, the methods could be used when the UE 104 acts as a transmitter and the base station 102 acts as a receiver wherein data is transmitted from the UE 104 to the base station 102. The methods could generally be used between any suitable transmitter and receiver.

The method steps shown in FIG. 3 and the modules shown in FIG. 2 may be implemented in hardware or in software executed on the processor 106, e.g. at the UE 104. When the method steps and modules are implemented in software, they may be provided by way of a computer program product embodied on a non-transient computer-readable medium which is configured so as when executed on the processor 106 to perform the function of the modules in the methods described herein.

As described above, the methods may relate to communication following the 3GPP protocols. The methods may be used for any appropriate standard such as High Speed Packet Access (HSPA), LTE, and respective evolutions including HSPA+ and LTE-Advanced.

Furthermore, while this disclosure has been particularly shown and described with reference to embodiments, it will be understood to those skilled in the art that various changes in form and detail may be made without departing from the scope of the invention as defined by the appendant claims.

The invention claimed is:

1. A method of decoding a coded data block received at a receiver, the method comprising:
   receiving a first plurality of coded data bits representing the coded data block;
   determining first soft information values corresponding to respective ones of the received first plurality of coded data bits, wherein each of the soft information values indicates a likelihood of a corresponding coded data bit having a particular value;
   attempting to decode the coded data block using the first soft information values;
   compressing the first soft information values using a compression scheme to map a plurality of ranges of uncompressed soft information values to a respective plurality of compressed soft information values, wherein said compression scheme is either a non-linear compression scheme in which the ranges are of unequal size or the compression scheme is a linear compression scheme in which the ranges are of equal sizes;
   causing the compressed first soft information values to be stored in a data store;
   receiving a second plurality of coded data bits representing the coded data block;
   determining second soft information values corresponding to respective ones of the received second plurality of coded data bits;
   retrieving the compressed first soft information values from the data store;
   decompressing the retrieved first soft information values;
   combining the decompressed first soft information values with the second soft information values; and
   attempting to decode the coded data block using the combined soft information values.

2. The method of claim 1 further comprising determining whether the attempt to decode the coded data block using the first soft information values has failed,
   wherein the operations of compressing the first soft information values and causing the compressed first soft information values to be stored in the data store are performed responsive to determining that the attempt to decode the coded data block using the first soft information values has failed.

3. The method of claim 2 wherein said determining whether the attempt to decode the coded data block using the first soft information values has failed comprises performing a cyclic redundancy check.

4. The method of claim 1 wherein said second plurality of coded data bits representing the coded data block is a retransmission of the coded data block.

5. The method of claim 4 wherein at least some of the second plurality of coded data bits are a retransmission of a corresponding at least some of the first plurality of coded data bits.

6. The method of claim 1 wherein said compressing the first soft information values halves the number of bits of each of the first soft information values.

7. The method of claim 6 wherein each of the uncompressed soft information values has 8 bits and each of the compressed soft information values has 4 bits.

8. The method of claim 1 wherein said decompressing the retrieved first soft information values comprises using a decompression scheme to map a plurality of compressed soft information values to a respective plurality of decompressed soft information values, wherein the decompression scheme corresponds to the compression scheme used to compress the first soft information values.

9. The method of claim 1 wherein the sizes of the ranges are smaller nearer to the middle of the total range of possible uncompressed soft information values.

10. The method of claim 1 wherein the data store is either: (i) internal to the receiver, or (ii) external to the receiver.

11. The method of claim 1 wherein the receiver implements a Hybrid Automatic Repeat Request protocol to receive the coded data block.

12. The method of claim 1 wherein the soft information values are Log-Likelihood Ratio values.

13. A receiver configured to decode a received coded data block, the receiver comprising:
   a receiver module configured to receive a first plurality of coded data bits representing the coded data block, the receiver module being further configured to receive a second plurality of coded data bits representing the coded data block;
   a determining module configured to determine first soft information values corresponding to respective ones of the received first plurality of coded data bits, the determining module being further configured to determine second soft information values corresponding to respective ones of the received second plurality of coded data bits, wherein each of the soft information values indicates a likelihood of a corresponding coded data bit having a particular value;
   a decoder configured to attempt to decode the coded data block using the first soft information values;
   a compressing module configured to compress the first soft information values using a compression scheme to map a plurality of ranges of uncompressed soft information values to a respective plurality of compressed soft information values, wherein said compression scheme is either a non-linear compression scheme in which the ranges are of unequal size or the compression scheme is a linear compression scheme in which the ranges are of equal sizes, and wherein the receiver is configured to cause the compressed first soft information values to be stored in a data store;

a decompressing module configured to receive the compressed first soft information values retrieved from the data store and to decompress the retrieved first soft information values; and a combining module configured to combine the decompressed first soft information values with the second soft information values, wherein the decoder is further configured to attempt to decode the coded data block using the combined soft information values.

14. The receiver of claim 13 further comprising a checking module configured to determine whether the attempt to decode the coded data block using the first soft information values has failed, wherein, responsive to said checking module determining that the attempt to decode the coded data block using the first soft information values has failed, the compressing module is configured to compress the first soft information values, and the receiver is configured to cause the compressed first soft information values to be stored in the data store.

15. The receiver of claim 14 wherein said checking module is configured to perform a cyclic redundancy check.

16. The receiver of claim 13 further comprising said data store.

17. The receiver of claim 13 wherein said data store is external to the receiver, and wherein the receiver is configured to transmit the compressed first soft information values to the data store and retrieve the compressed first soft information values from the data store.

18. A computer program product configured to decode a coded data block received at a receiver, the computer program product being embodied on a non-transient computer-readable medium and configured so as when executed on a processor of the receiver to perform the method comprising:

receiving a first plurality of coded data bits representing the coded data block;

determining first soft information values corresponding to respective ones of the received first plurality of coded data bits, wherein each of the soft information values indicates a likelihood of a corresponding coded data bit having a particular value;

attempting to decode the coded data block using the first soft information values;

compressing the first soft information values using a compression scheme to map a plurality of ranges of uncompressed soft information values to a respective plurality of compressed soft information values, wherein said compression scheme is either a non-linear compression scheme in which the ranges are of unequal size or the compression scheme is a linear compression scheme in which the ranges are of equal sizes;

causing the compressed first soft information values to be stored in a data store;

receiving a second plurality of coded data bits representing the coded data block;

determining second soft information values corresponding to respective ones of the received second plurality of coded data bits;

retrieving the compressed first soft information values from the data store;

decompressing the retrieved first soft information values;

combining the decompressed first soft information values with the second soft information values; and attempting to decode the coded data block using the combined soft information values.

\* \* \* \* \*